US012662155B2

(12) United States Patent     (10) Patent No.:   US 12,662,155 B2

Ishida et al.     (45) Date of Patent:    Jun. 23, 2026

(54) DROP-OFF ASSISTANCE DEVICE AND DROP-OFF ASSISTANCE SYSTEM

(71) Applicant: TOYOTA JIDOSHA KABUSHIKI KAISHA, Toyota (JP)

(72) Inventors: Masaho Ishida, Toyota (JP); Hiroaki Iida, Hashima (JP); Issei Matsunaga, Nagoya (JP); Haruki Hirasawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 19/032,720

(22) Filed: Jan. 21, 2025

(65) Prior Publication Data

US 2025/0346247 A1     Nov. 13, 2025

(30) Foreign Application Priority Data

May 10, 2024    (JP) ................................. 2024-077110

(51) Int. Cl.
| | |
|---|---|
| *B60W 50/14* | (2020.01) |
| *G06V 20/58* | (2022.01) |

(52) U.S. Cl.
CPC ............. *B60W 50/14* (2013.01); *G06V 20/58* (2022.01); *B60W 2050/143* (2013.01); *B60W 2420/403* (2013.01); *B60W 2420/408* (2024.01); *B60W 2556/65* (2020.02)

(58) Field of Classification Search
CPC ........... B60W 50/14; B60W 2050/143; B60W 2420/403; B60W 2420/408; B60W 2556/65; G06V 20/58
See application file for complete search history.

(56) References Cited

U.S. PATENT DOCUMENTS

| | | | |
|---|---|---|---|
| 9,969,261 | B2 | 5/2018 | Kodama |
| 10,045,173 | B1 | 8/2018 | Morimura et al. |
| 10,106,157 | B2 | 10/2018 | Sawada et al. |
| 10,150,407 | B2 | 12/2018 | Takahashi et al. |
| 10,696,297 | B2 | 6/2020 | Nguyen Van et al. |
| 11,001,255 | B2 | 5/2021 | Fukuman et al. |
| 11,110,937 | B2 | 9/2021 | Kinoshita et al. |
| 12,394,782 | B2 * | 8/2025 | Guan ................ H01M 10/0525 |
| 2012/0262284 | A1 * | 10/2012 | Irrgang ................. B60W 50/14 |
| | | | 340/435 |

(Continued)

FOREIGN PATENT DOCUMENTS

JP      2020-093567 A     6/2020

*Primary Examiner* — Mohamed Barakat

(74) *Attorney, Agent, or Firm* — SoraIP, Inc.

(57) ABSTRACT

The drop-off assistance device includes: a sensor for detecting an object behind the vehicle; a communication device capable of communicating with another vehicle; a notification device for notifying an occupant of the vehicle; a sensor; a communication device; and a controller connected to the notification device, wherein the controller detects a rear vehicle located behind the vehicle based on a detection result of the sensor at the time of parking and stopping the vehicle, establishes communication with the rear vehicle in response to the detection of the rear vehicle, and causes the notification device to notify the presence of the approaching object in response to the communication device receiving the detection of the approaching object to be notified from the rear vehicle.

4 Claims, 5 Drawing Sheets

(56)            References Cited

U.S. PATENT DOCUMENTS

| | | | |
|---|---|---|---|
| 2014/0015693 A1* | 1/2014 | Komoguchi | G08G 1/166 |
| | | | 340/935 |
| 2016/0110618 A1* | 4/2016 | Oba | G06V 20/597 |
| | | | 348/148 |
| 2019/0001968 A1 | 1/2019 | Yorifuji et al. | |
| 2019/0283747 A1* | 9/2019 | Okabe | B60W 30/10 |
| 2019/0315349 A1* | 10/2019 | Takaki | B60W 30/09 |
| 2019/0344828 A1 | 11/2019 | Omori et al. | |
| 2019/0389488 A1 | 12/2019 | Yamada et al. | |
| 2022/0305991 A1* | 9/2022 | Takeuchi | B60Q 9/00 |

* cited by examiner

DROP-OFF ASSISTANCE DEVICE AND DROP-OFF ASSISTANCE SYSTEM

CROSS-REFERENCE TO RELATED APPLICATION

This application claims priority to Japanese Patent Application No. 2024-077110 filed on May 10, 2024, incorporated herein by reference in its entirety.

BACKGROUND

1. Technical Field

The present disclosure relates to a drop-off assistance device and a drop-off assistance system.

2. Description of Related Art

Japanese Unexamined Patent Application Publication No. 2020-93567 (JP 2020-93567 A) discloses a drop-off assistance device. The drop-off assistance device executes alert and/or door opening restriction when a drop-off motion by an occupant of a host vehicle is detected and an object approaching the host vehicle is detected. The drop-off assistance device uses an electronic outer mirror when a blocking object is present behind the host vehicle while the host vehicle is being parked or stopped, and uses a rear side radar when no blocking object is present.

SUMMARY

In the drop-off assistance device described in JP 2020-93567 A, the external sensors are selectively used depending on the presence or absence of a blocking object behind the vehicle. Therefore, a plurality of external sensors is required for the host vehicle. The present disclosure provides a technology capable of appropriately executing drop-off assistance without assuming that a host vehicle includes a plurality of external sensors.

A drop-off assistance device according to an aspect of the present disclosure includes:

- a sensor configured to detect an object behind a vehicle;
- a communication device configured to communicate with other vehicles;
- a notification device configured to notify an occupant of the vehicle; and
- a controller connected to the sensor, the communication device, and the notification device.

The controller is configured to:

- detect a rear vehicle located behind the vehicle based on a detection result from the sensor during parking or stopping of the vehicle;
- cause the communication device to establish communication with the rear vehicle in response to detection of the rear vehicle; and
- when the communication device receives, from the rear vehicle, detection of an approaching object that is a target of notification, cause the notification device to give a notification about presence of the approaching object.

A drop-off assistance system according to an aspect of the present disclosure includes:

- a first controller mounted on a first vehicle; and
- a second controller mounted on a second vehicle.

The first controller is configured to detect the second vehicle located behind the first vehicle based on a detection result from a sensor of the first vehicle during parking or stopping of the first vehicle, and establish communication between the first vehicle and the second vehicle in response to detection of the second vehicle.

The second controller is configured to detect an approaching object that is a target of notification based on a detection result from a sensor of the second vehicle, or receive detection of the approaching object from a rear vehicle behind the second vehicle, and transmit information on the approaching object to the first vehicle.

The first controller is configured to cause the first vehicle to give a notification about presence of the approaching object in response to reception of the information on the approaching object from the second vehicle.

The present disclosure provides the technology capable of appropriately executing the drop-off assistance without assuming that the host vehicle includes a plurality of external sensors.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings.

Configuration of the Vehicle

Figure 1:
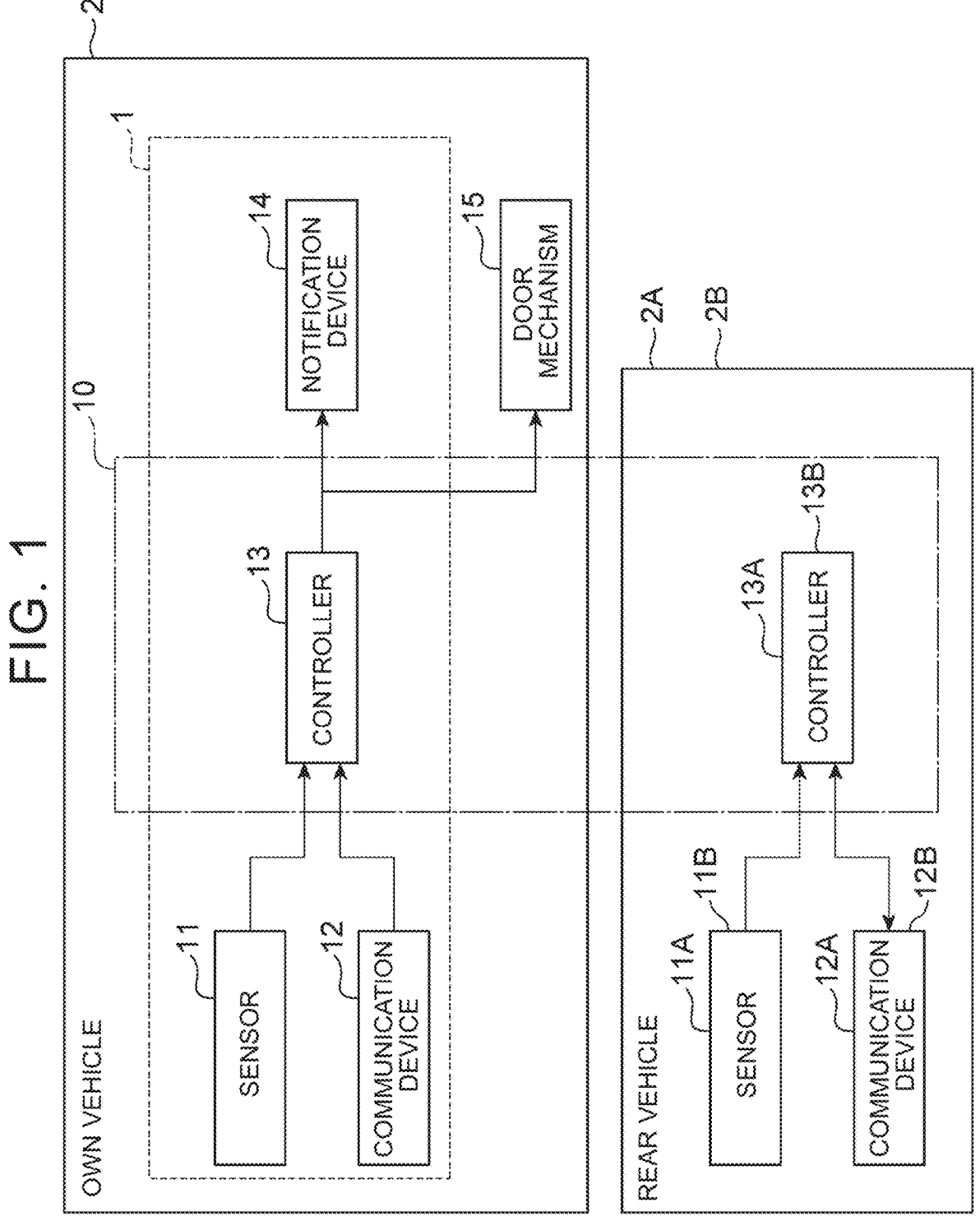
FIG. 1 is a block diagram illustrating an example of a configuration of an own vehicle equipped with a drop-off assistance device according to an embodiment and a configuration of another vehicle.

FIG. 1 is a block diagram illustrating an example of a configuration of an own vehicle equipped with a drop-off assistance device according to an embodiment and a configuration of another vehicle. As illustrated in FIG. 1, the drop-off assistance device 1 is mounted on the host vehicle 2 (vehicle, an example of the first vehicle) as an example. The host vehicle 2 may be a vehicle driven by a driver or an autonomous vehicle.

The host vehicle 2 includes a sensor 11, a communication device 12, a controller 13 (an example of a first controller), a notification device 14, and a door mechanism 15. The host vehicle 2 may not include the door mechanism 15. The drop-off assistance device 1 includes a sensor 11, a communication device 12, a controller 13, and a notification device 14. The drop-off assistance device 1 may include a door mechanism 15.

The sensor 11 is an external sensor that detects an object around the host vehicle 2. The sensor 11 includes a sensor that detects an object behind the host vehicle 2. As an example, the sensor 11 is a rear side sensor in which a rear side of the host vehicle 2 is a detection range. The rear side sensor is not particularly limited as long as it can detect an object, and may be a camera, a radar, a rider, a sonar, or the like. The sensor 11 may be configured integrally with a control unit that executes recognition processing and the like.

The communication device 12 is a device capable of communicating with another vehicle. The communication device 12 performs inter-vehicle communication with another vehicle. The communication device 12 of the host vehicle 2 is configured to be able to communicate with each communication device of another vehicle (here, for example, the rear vehicle 2A, 2B).

The controller 13 has a function of integrating the drop-off assistance device. The controllers 13 are, for instance, made of Electronic Control Unit (ECU). ECU is an electronic control unit having a processor such as Central Processing Unit (CPU), a storage device such as a ROM and RAM, a storage device such as a Controller Area Network (CAN) communication circuit, and an input/output circuit. The controller 13 is connected to and controlled by the sensor 11, the communication device 12, and the notification device 14. The controller 13 may be connected to and controlled by the door mechanism 15. The controllers 13 may be configured by a plurality of ECU.

The notification device 14 is a device that notifies the occupant of the host vehicle 2 of information. The information is support information related to getting off, and includes an alert and an alarm as an example. The notification device 14 is not particularly limited as long as it notifies the occupant of information. As an example, the notification device 14 is an indicator provided in an outer mirror, an instrument cluster, a buzzer capable of outputting an alarm sound, a speaker capable of outputting an alarm sound and a sound, or the like.

The door mechanism 15 is a device that controls the door of the host vehicle 2. The door mechanism 15 may be, for example, a mechanism that performs latching and unlatching of a door by electronic control, or a power slide door that performs electric opening and closing.

The controller 13 supports an occupant who gets off based on the detection result of the sensor 11 at the time of parking and stopping of the vehicle. The controller 13 determines that the host vehicle 2 has been parked or stopped based on a detection result of a vehicle speed sensor (not shown). The controller 13 recognizes an object approaching from the rear of the host vehicle 2 as an approaching object to be notified. The approaching object is, for example, a vehicle, a two-wheeled vehicle, a bicycle, a kickboard, a pedestrian, or the like. Hereinafter, an example in which the approaching object is the approaching vehicle will be described. The controller 13 causes the door mechanism 15 to prevent the door from being opened or causes the notification device 14 to issue an alarm when the occupant attempts to get off the vehicle in a case where there is a nearby vehicle. Alternatively, the controller 13 may cause the notification device 14 to perform an alarm when the door is in the open state.

Figure 2:
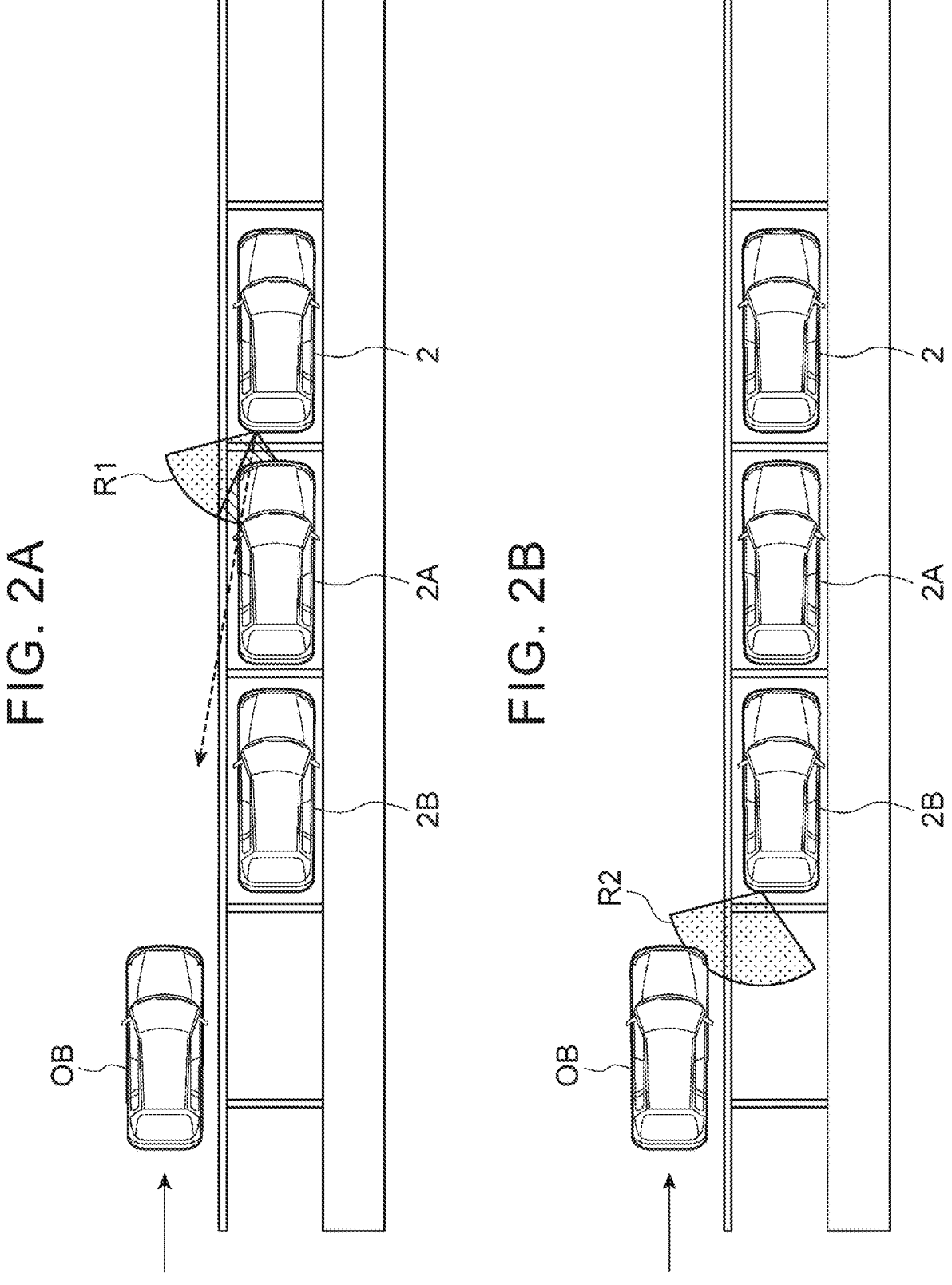
FIG. 2A is a diagram illustrating an example of a detection range of a sensor of an own vehicle at a time of tandem parking.
FIG. 2B is a diagram illustrating an example of a detection range of a sensor of a rear vehicle at a time of tandem parking.

FIG. 2A is a diagram illustrating an example of a detection area of a sensor of an own vehicle at the time of tandem parking. As shown in FIG. 2A, at the time of tandem parking, the detection area R1 of the sensor 11 is shielded by the rear vehicle 2A (an exemplary second vehicle). The rear vehicle 2A is at least one of a vehicle parked and stopped behind the host vehicle 2 and a vehicle towed by the host vehicle 2. In this case, the detection area R1 of the sensor 11 cannot detect the approaching vehicle OB. In such cases, the controllers 13 communicate with the rear vehicle 2A and support the occupants who get off the vehicle based on the obtained data. When a low-speed train such as a traffic jam is formed, the controller 13 communicates with the rear vehicle 2A and supports an occupant who gets off the train based on the obtained information, similarly to the case of parking by the vertical train.

The controller 13 detects the rear vehicle 2A located behind the host vehicle 2 based on the detection result of the sensor 11 when the vehicle is parked and stopped. The controller 13 causes the communication device 12 to establish communication with the rear vehicle 2B in response to the detection of the rear vehicle 2A.

Returning to FIG. 1, the rear vehicle 2A includes a sensor 11A, a communication device 12A, and a controller 13A (an exemplary second controller). The rear vehicle 2B includes a sensor 11B, a communication device 12B, and a controllers 13B. The sensor 11A, 11B has the same configuration as that of the sensor 11. The communication device 12A, 12B has the same configuration as that of the communication device 12. The controller 13A, 13B has the same configuration as that of the controller 13, and the functions thereof are partially different. Specifically, the controller 13A, 13B establishes communication of the communication device 12A, 12B at the time of parking and stopping of the vehicle. The controller 13A, 13B is configured to detect the proximity vehicle based on the detection result of the sensor 11A, 11B, or to receive the detection of the proximity vehicle from the rear vehicle thereof, and transmit the information of the proximity vehicle to the host vehicle 2.

FIG. 2B is a diagram illustrating an example of a detection area of a sensor of a rear vehicle of a host vehicle at the time of tandem parking. As shown in FIG. 2B, the detection area R2 of the sensor 11B of the rear vehicle 2B is not shielded and the approaching vehicle OB can be detected. The rear vehicle 2B transmits the information of the approaching vehicle OB to the rear vehicle 2A. The rear vehicle 2A transmits information of the approaching vehicle OB to the host vehicle 2. The controller 13 causes the notification device 14 to notify the presence of the approaching vehicle OB in response to the communication device 12 receiving the approaching vehicle OB from the rear vehicle 2A. Thus, even when there is a shield behind the host vehicle 2, the controllers 13 can support an occupant who gets off by cooperating with the rear vehicle 2A, 2B.

In FIG. 1 and FIGS. 2A and 2B, an example in which two subsequent vehicles are provided has been described, but one or a plurality of subsequent vehicles may be provided. As shown in FIG. 1, the controllers 13, 13A constitute the drop-off assistance system 10.

Operation of the Drop-Off Assistance Device

Figure 3:
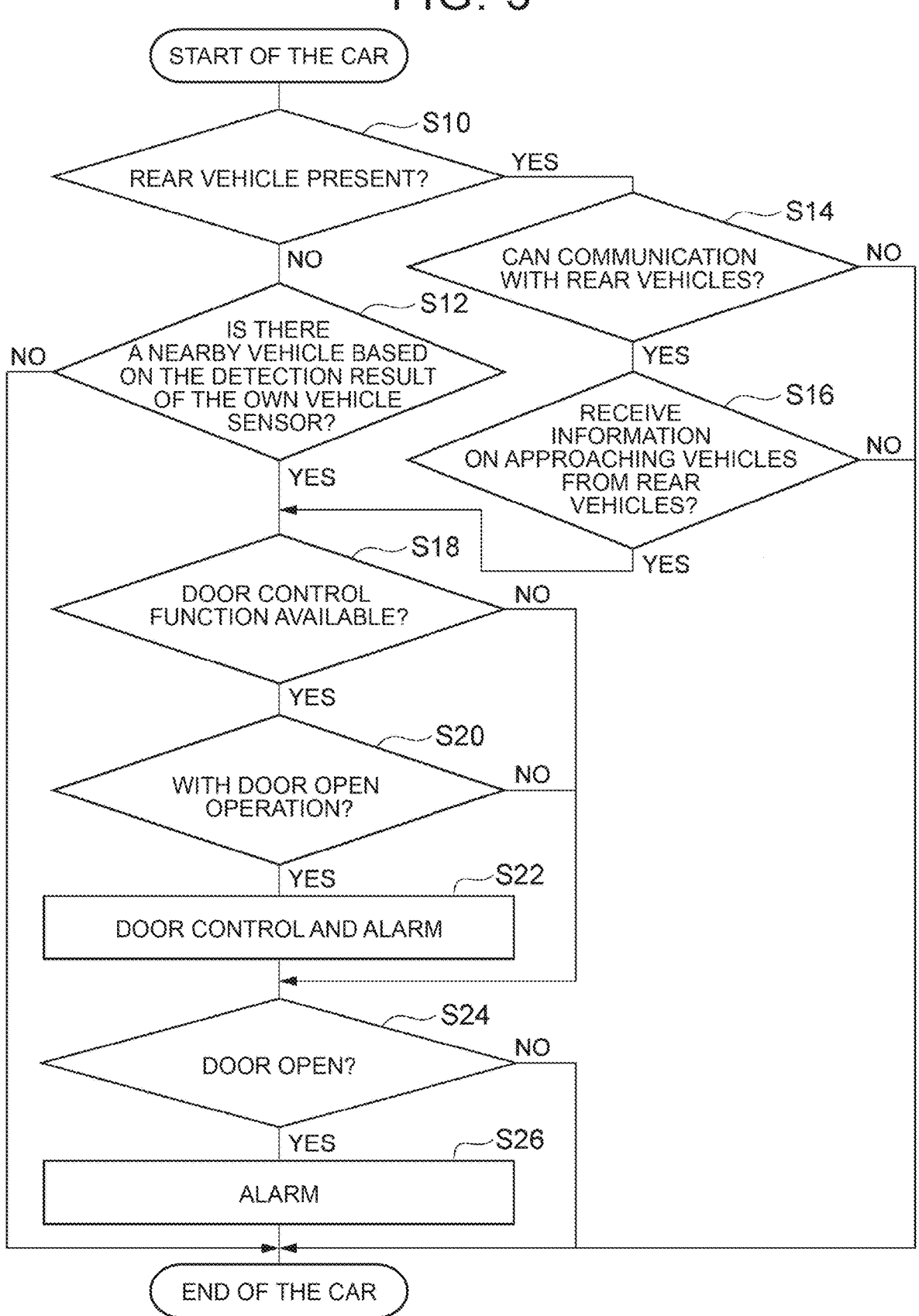
FIG. 3 is a flowchart illustrating an operation of the drop-off assistance device.

FIG. 3 is a flowchart illustrating an operation of the drop-off assistance device. The flowchart illustrated in FIG. 3 is executed by the controller 13 of the host vehicle 2 at a timing when, for example, a door opening operation or a door unlocking operation of the occupant is accepted.

As illustrated in FIG. 3, in S10, the controllers 13 determine whether or not there is a rear vehicle in the host vehicle 2 based on the detection result of the sensor 11.

When it is determined that the rear vehicle 2A does not exist in the host vehicle 2 (S10: NO), the controller 13 determines whether or not the approaching vehicle OB exists in S12 based on the detection result of the sensor 11 of the host vehicle 2.

When it is determined that the rear vehicle 2A is present in the host vehicle 2 (S10: YES), the controller 13 determines whether or not communication with the rear vehicle 2A is enabled in S14. When it is determined that communication with the rear vehicle 2A is possible (S14: YES), the controller 13 determines whether or not the rear vehicle 2A has received the information of the approaching vehicle OB in S16.

When it is determined that the approaching vehicle OB is present based on the detection result of the sensor 11 (S12: YES) or when it is determined that the information of the approaching vehicle OB is received from the rear vehicle 2A (S16: YES), the controller 13 determines whether or not the door control function is present in S18.

When it is determined that the door control function is present (S18: YES), the controller 13 determines whether or not a door opening operation is accepted in S20. When it is determined that the door opening operation is accepted (S20: YES), the controller 13 causes the door mechanism 15 to perform door control in S22. The door mechanism 15 controls the door so as not to open, for example. The controller 13 causes the notification device 14 to perform an alarm in conjunction with the door control.

When it is determined that the door control function does not exist (S18: NO), when it is determined that the door opening operation is not accepted (S20: NO), or when S22 is completed, the controller 13 determines whether or not the door is open in S24.

When it is determined that the door is in the open state (S24: YES), the controller 13 causes the notification device 14 to perform an alarm in S26.

When it is determined that the approaching vehicle OB does not exist based on the detection result of the sensor 11 (S12: NO), the controller 13 ends the flow chart shown in FIG. 3. When it is determined that communication with the rear vehicle 2A is not possible (S14: NO), the controller 13 ends the flow chart shown in FIG. 3. When it is determined that the approaching vehicle OB is not received from the rear vehicle 2A (S16: NO), the controller 13 ends the flow chart shown in FIG. 3. If it is determined that the doors are not open (S24: NO), or if S26 is terminated, the controllers 13 terminate the flow chart shown in FIG. 3. The controller 13 determines whether or not the termination condition is satisfied, and when the termination condition is not satisfied, starts the flowchart illustrated in FIG. 3 from the beginning. As an example, the termination condition is satisfied when a few minutes (for example, three minutes) have elapsed since the ignition OFF operation or the door-lock operation was accepted.

By executing the flowchart shown in FIG. 3, the drop-off assistance device 1 assists the getting-off of the occupant based on the detection result of the sensor 11 of the host vehicle 2 when there is no rear vehicle. When there is a rear vehicle, the drop-off assistance device 1 can assist the getting-off of the occupant based on the data transmitted from the rear vehicle 2A.

Operation of the Rear Vehicle

Figure 4:
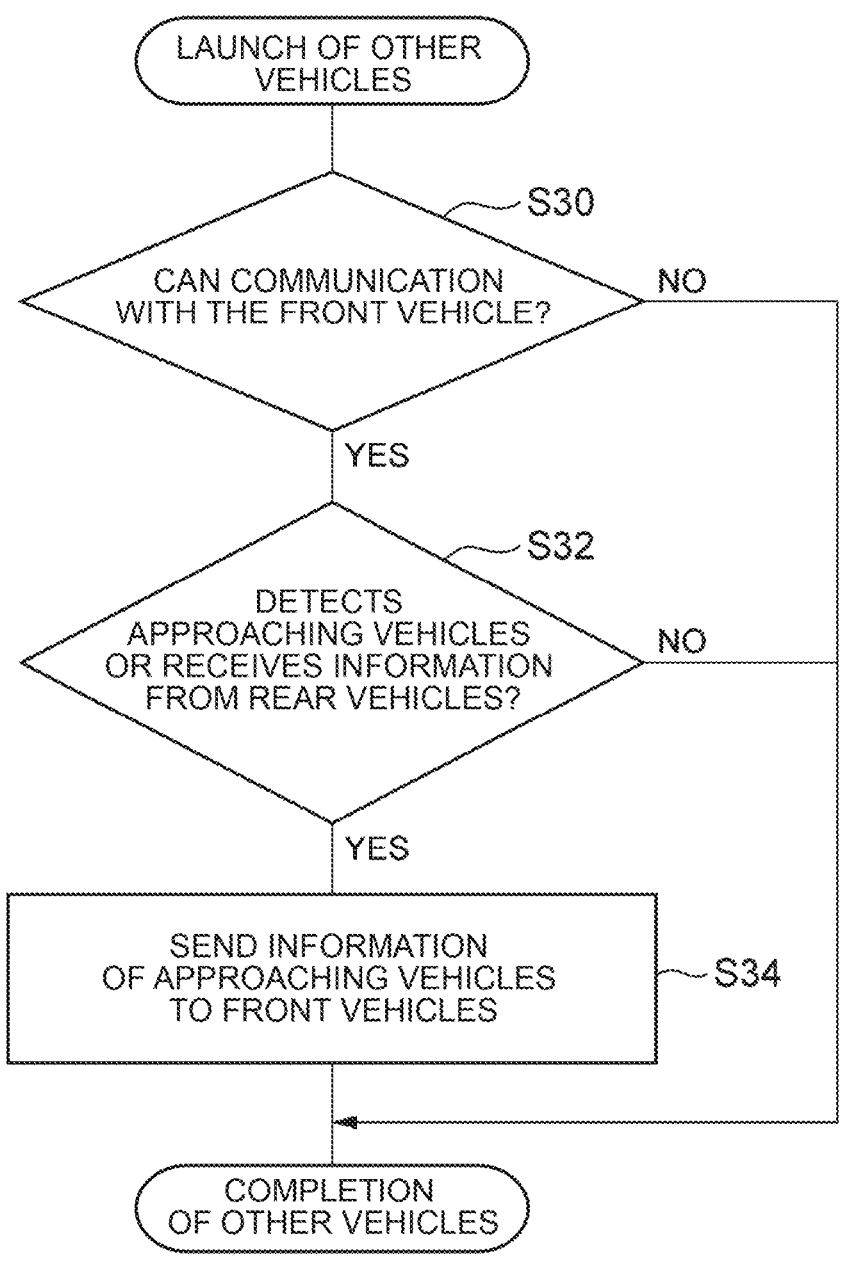
FIG. 4 is a flow chart illustrating the operation of a rear vehicle.

FIG. 4 is a flowchart illustrating an operation of the rear vehicle. The flow chart shown in FIG. 4 is executed by the rear vehicle 2A, 2B. Since the operations of the rear vehicle 2A, 2B are the same, the operations of the rear vehicle 2A will be representatively described below.

As shown in FIG. 4, the controllers 13A determines whether or not communication with the forward vehicles is enabled in S30. Here, the front vehicle is the host vehicle 2. If it is determined that communication with the forward vehicle is possible (S30: YES), the controller 13A determines whether or not an approaching vehicle OB has been detected by the sensor 11A in S32. Alternatively, the controller 13A determines whether or not the information of the approaching vehicle OB has been received from the rear vehicle 2B in S32.

When it is determined by the sensor 11A that the approaching vehicle OB has been detected (S32: YES) or when it is determined that the information on the approaching vehicle OB has been received from the rear vehicle 2B (S32: YES), the controller 13A transmits the information on the approaching vehicle OB to the front vehicle in S34.

If it is determined that communication with the forward vehicles is not possible (S30: NO), the flow chart shown in FIG. 4 ends. When it is determined by the sensor 11A that the approaching vehicle OB has not been detected and it is determined that the approaching vehicle OB has not been received from the rear vehicle 2B (S32: NO), or when S34 ends, the flow chart shown in FIG. 4 ends.

By executing the flow chart shown in FIG. 4, the rear vehicle 2A can transmit information on the approaching vehicle OB detected by itself and information on the approaching vehicle OB received from the rear vehicle 2B to the host vehicle 2. Similarly, the rear vehicle 2B can transmit the information of the approaching vehicle OB detected by itself to the rear vehicle 2A.

SUMMARY OF EMBODIMENTS

According to the drop-off assistance device 1, the rear vehicle 2A located behind the host vehicle 2 is detected based on the detection result of the sensor 11 at the time of parking and stopping of the vehicle. In response to detection of the rear vehicle 2A, communication with the rear vehicle 2A is established by the communication device 12. The presence of the approaching vehicle OB is notified by the notification device 14 in response to the communication device 12 receiving the detection of the approaching vehicle OB from the rear vehicle 2A. In this way, even when the detected area of the sensor 11 is shielded by the rear vehicle 2A, the drop-off assistance device 1 can assist the getting-off of the occupant. Therefore, the drop-off assistance device 1 can appropriately perform getting-off assistance without assuming that the host vehicle 2 includes a plurality of external sensors (additional sensors different from the sensors 11).

While exemplary embodiments have been described above, various omissions, substitutions, and changes may be made without being limited to the exemplary embodiments described above.

For example, the sensor 11A,11B of the rear vehicle 2A, 2B may be lateral or forward, as well as rearward. In this case, the host vehicle 2 can receive the information of the approaching vehicle OB that has passed through the rear vehicle 2A, 2B via communication. In addition, the drop-off assistance device 1 may perform control by switching to detecting the sensor 11 when the approaching vehicle OB detected by the rear vehicle 2A, 2B passes through the rear vehicle 2A, 2B.

Figure 5:
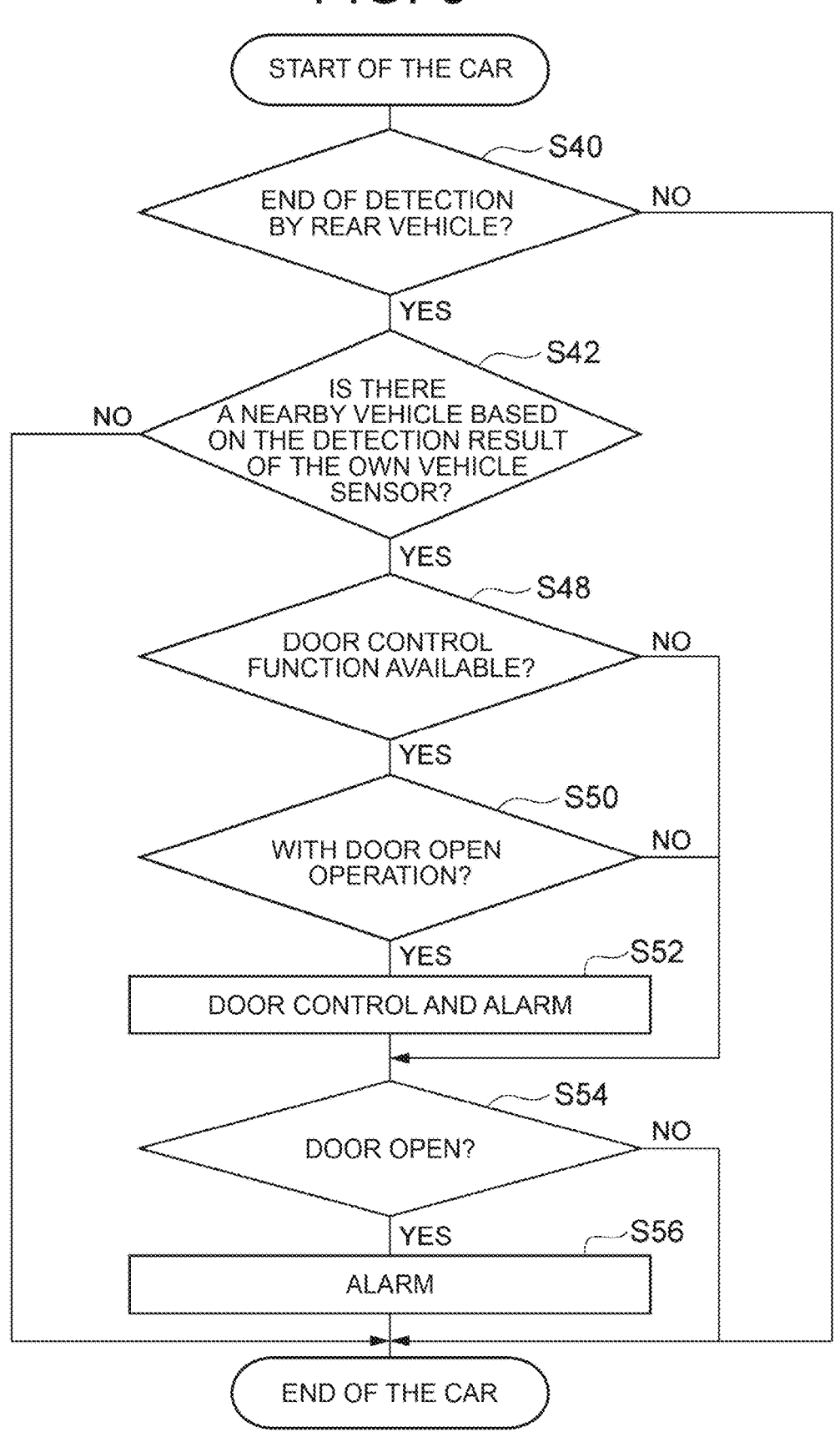
FIG. 5 is a flowchart illustrating an operation of the drop-off assistance device according to the modification.

FIG. 5 is a flowchart illustrating an operation of the drop-off assistance device according to the modification. The flow chart shown in FIG. 5 starts when it is determined that the approaching vehicle OB is received from the rear vehicle 2A (S16: YES in FIG. 3).

As illustrated in FIG. 5, the controller 13 determines whether the detection by the rear vehicle has ended. When it is determined that the information of the approaching vehicle OB is not received from the rear vehicle 2A (S16: NO in FIG. 3), the controller 13 determines that the detection by the rear vehicle has ended.

When it is determined that the detection by the rear vehicle has ended (S40: YES), the controller 13 determines whether or not the approaching vehicle OB exists based on the detection result of the sensor 11 of the host vehicle 2 in S46. This process is the same as S12 of FIG. 3. The process from S48 to S56 is also the same as the process from S18 to S26 in FIG. 3. When it is determined that the detected approaching vehicle OB is not detected based on the information received from the rear vehicle 2A by executing the flow chart shown in FIG. 5, the drop-off assistance device 1 can detect the approaching vehicle OB by the sensor 11 and cause the notification device 14 to notify the presence of the approaching vehicle OB.

What is claimed is:

1. A drop-off assistance device comprising:
a sensor configured to detect an object behind a vehicle;
a communication device configured to communicate with other vehicles;
a notification device configured to notify an occupant of the vehicle about information; and
a controller connected to the sensor, the communication device, and the notification device, wherein the controller is configured to:
detect a rear vehicle located behind the vehicle based on a detection result from the sensor during parking or stopping of the vehicle;
cause the communication device to establish communication with the rear vehicle in response to detection of the rear vehicle; and
when the communication device receives, from the rear vehicle, detection of an approaching object that is a target of notification, cause the notification device to give a notification about presence of the approaching object.

2. The drop-off assistance device according to claim 1, wherein the rear vehicle is at least either of a vehicle parked or stopped behind the vehicle and a vehicle towed by the vehicle.

3. The drop-off assistance device according to claim 1, wherein the controller is configured to, when determination is made that the approaching object that has ever been detected is not currently detected based on information received from the rear vehicle, detect the approaching object using the sensor and cause the notification device to give a notification about the presence of the approaching object.

4. A drop-off assistance system comprising:
a first controller mounted on a first vehicle; and
a second controller mounted on a second vehicle, wherein
the first controller is configured to detect the second vehicle located behind the first vehicle based on a detection result from a sensor of the first vehicle during parking or stopping of the first vehicle, and establish communication between the first vehicle and the second vehicle in response to detection of the second vehicle,
the second controller is configured to detect an approaching object that is a target of notification based on a detection result from a sensor of the second vehicle, or receive detection of the approaching object from a rear vehicle behind the second vehicle, and transmit information on the approaching object to the first vehicle, and
the first controller is configured to cause the first vehicle to give a notification about presence of the approaching object in response to reception of the information on the approaching object from the second vehicle.

* * * * *